June 21, 1960 E. G. SWICK 2,942,228

POLARIZED MOUNTING CLIP FOR RECTIFIER

Filed July 15, 1957

INVENTOR.
Edwin Grant Swick
BY
Olson & Trexler attys.

United States Patent Office 2,942,228
Patented June 21, 1960

2,942,228

POLARIZED MOUNTING CLIP FOR RECTIFIER

Edwin Grant Swick, Bartlett, Ill., assignor to Illinois Tool Works, Chicago, Ill., a corporation of Illinois Filed July 15, 1957, Ser. No. 671,986

9 Claims. (Cl. 339—150)

The present invention relates to novel holder or clip means for supporting an article on an apertured workpiece or other suitable base means, and more particularly to novel clip or holder means especially suitable for mounting a silicon rectifier to a support panel or element of any desired piece of equipment such as a chassis for a television set, radio or the like.

Means heretofore in general use for mounting silicon rectifiers have not provided for positively orientating the rectifier in a predetermined manner so as to insure proper polarization of the rectifier. It is therefore an important object of the present invention to provide a novel holder or clip means which is constructed so as positively to insure mounting of a silicon rectifier or the like so that it is orientated in a predetermined manner.

A more specific object of the present invention is to provide a novel holder or clip means of the above described type which comprises two substantially identical clip elements so as to promote more economical production of the clip means.

Still another object of the present invention is to provide a novel holder or clip means of the above described type which is constructed so as to maintain a rectifier or the like in properly spaced or other desired relationship with respect to a workpiece or panel to which the mounting means or clip means is secured.

A further object of the present invention is to provide holder or clip elements of the above described type having integral means which facilitates fastening of the clip elements to a workpiece or panel without requiring auxiliary fastening means such as rivets and the like.

Another more specific object of the present invention is to provide novel holder or clip elements of the above described type which are adapted to provide terminals on opposite sides of an apertured workpiece or panel to which they are applied.

Still another object of the present invention is to provide a novel holder or clip element of the type contemplated herein which is constructed so that a portion thereof may be readily positioned to make contact with a printed circuit element on the apertured workpiece or panel if desired.

Other objects and advantages of the present invention will become apparent from the following description and the accompanying drawings wherein.

Figures 1, 2, 3, 4, 5, 6, 7:
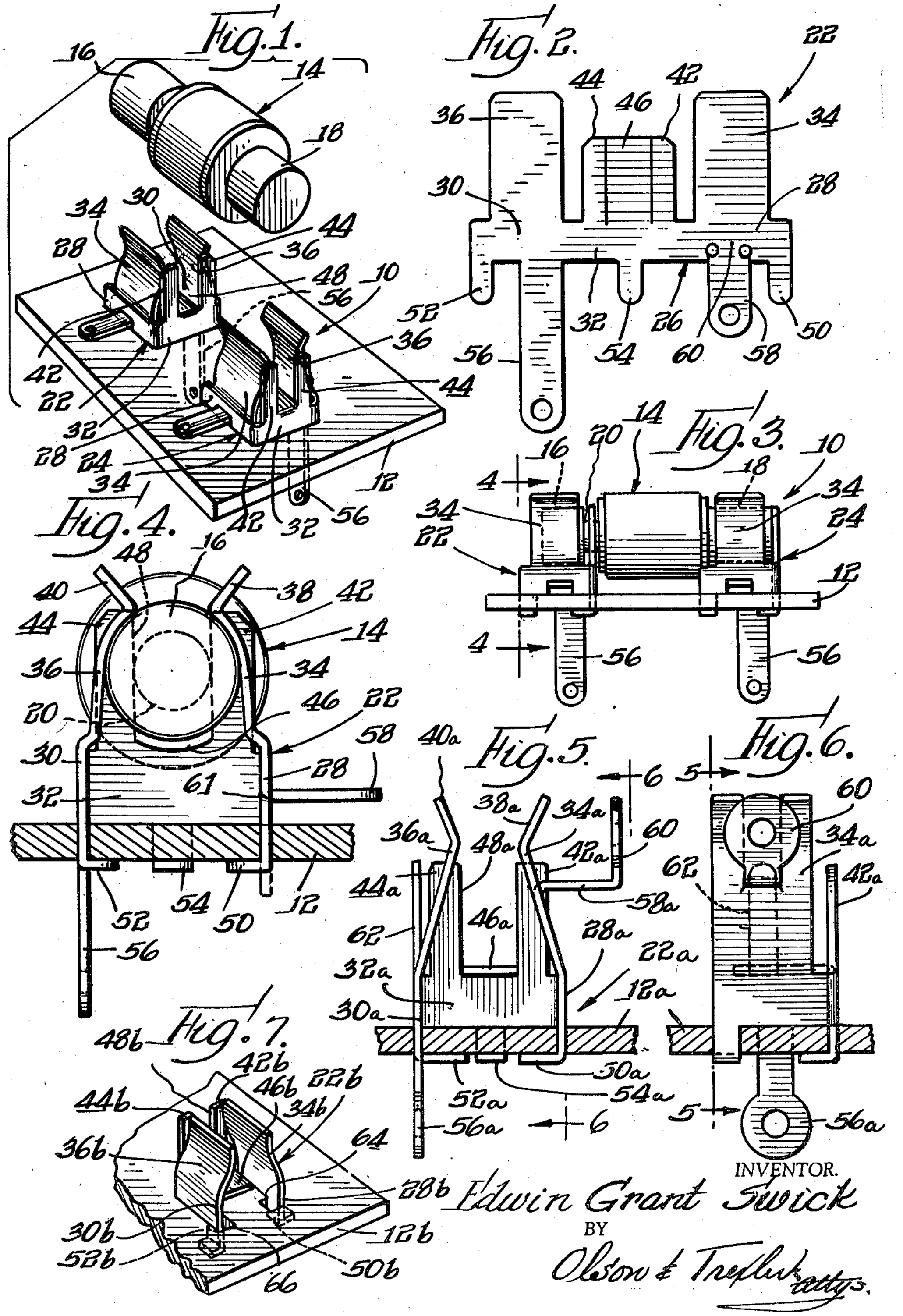
Fig. 1 is a perspective view showing a pair of clip elements incorporating features of the present invention assembled with an apertured panel so as to provide holder or clip means for accommodating a rectifier, and this figure further shows a rectifier in position to be applied to the holder or clip means.
Fig. 2 is a plan view showing a flat blank from which the clip element shown in Fig. 1 may be formed.
Fig. 3 is a side elevational view of the holder or clip means assembly shown in Fig. 1 and further shows the rectifier connected with the clip elements.
Fig. 4 is an enlarged partial cross sectional view taken along line 4—4 in Fig. 3.
Fig. 5 is a sectional view taken generally along line 5—5 in Fig. 6 and showing a modified form of the present invention.
Fig. 6 is a sectional view taken along line 6—6 in Fig. 5.
Fig. 7 is a fragmentary perspective view showing another modified form of the present invention.

Referring now more specifically to the drawings, wherein like parts are designated throughout the various figures by the same numerals, a clip means or holder assembly 10 incorporating features of the present invention is shown in Figs. 1 and 3, mounted on an apertured workpiece or panel 12, for receiving a rectifier 14. The rectifier has a central portion of known construction and opposite end terminals 16 and 18. The terminal 18 is preferably of uniform diameter throughout its length, while the terminal 16 has a reduced diameter portion 20 for the purpose described below. The holder or clip means 10 includes a pair of identical clip elements 22 and 24 mounted in spaced relationship and in a predetermined manner on the workpiece or panel 12 so that the clip 22 is adapted to receive and retain the rectifier terminal 16 and the clip 24 is adapted to receive and retain the terminal 18. As will be described more fully below, the construction and arrangement of the clips is such that the rectifier cannot be reversed or in other words the terminal 18 cannot be inserted into the clip 22.

Since the clips 22 and 24 are identical, only the clip 22 will be described in detail, and in addition identical reference numerals are applied to identical elements of the clips 22 and 24. The clip 22 has a central body portion 26 which is formed generally into a U-shape to provide a pair of opposite leg sections 28 and 30, joined by a bight portion 32. Opposing and resilient arms 34 and 36 extend upwardly from margins of the leg sections 28 and 30 for receiving and clamping resiliently a terminal of the rectifier therebetween. As shown best in Fig. 4, the arms 34 and 36 are inclined and curved toward each other for partially overlying and gripping the terminal, and outer end portions 38 and 40 of the arms are flared away from each other for facilitating application of the terminal between the arms.

It will be appreciated that the arms 34 and 36 define a portion of a resilient pocket or receptacle for a rectifier terminal having an axis disposed generally parallel to the workpiece or panel 12. In accordance with a feature of the present invention, one end of this pocket or receptacle is partially closed by fingers 42 and 44 extending upwardly in spaced apart relationship from the margin of the body section 32. A tab 46 is struck from between the fingers for forming a slot 48, which slot has a width less than the diameter of the rectifier terminal 18 and less than the greatest diameter of the terminal 16 but slightly larger than the diameter of the reduced terminal portion 20. In connection with this structure it is to be noted that the clips are applied to the workpiece or panel so the clip 24 is orientated in the same manner as the clip 22 and is disposed in opposing relationship to the body portion 32 and fingers 42 and 44. Thus, upon application of the rectifier to the clips a terminal of the rectifier must necessarily traverse the elements 32, 42 and 44 of the clip 22, but the opposite terminal of the rectifier will not traverse the corresponding elements of the clip 24. More specifically, this means that the rectifier must necessarily be orientated so that the terminal 16 will be applied to the clip 22 and the terminal 18 will be applied to the clip 24 since only the reduced diameter portion 20 of the terminal 16 can enter the slot 48 between the fingers 42 and 44 of the clip 22.

The tab 46 which is struck from the blank material to provide the slot 48 is folded inwardly so as to provide a resilient abutment or wall of the pocket or receptacle portion of the clip which serves to locate the rectifier terminal in a predetermined manner with respect to the workpiece or panel and also to cooperate with the arm portions 34 and 36 for resiliently gripping a terminal to insure proper electrical contact therewith. Preferably, the tab 46 is provided with a rounded transverse cross section as shown in Fig. 4 so as to obtain broader contact with the terminal and also so as to maintain a terminal generally centrally between the arm portions 34 and 36.

In order to facilitate mounting of the clip 22 to the workpiece or panel, the clip is provided with fingers or prongs 50, 52 and 54 respectively extending from opposite ends and an intermediate portion of the clip body and adapted to be inserted through apertures in the workpiece or panel. After these prongs have been inserted through the workpiece, their ends may be readily bent inwardly, as shown in Fig. 4, or even bent outwardly if desired beneath the panel so as to retain the clip in assembled relationship with the panel. Also extending from the lower margin of the clip body is a terminal element 56 which is adapted to project through an aperture in the workpiece or panel and to which an element of an electrical circuit may readily be connected. Another terminal element 58 has an integral junction 61 with the body of the clip spaced above the lower margin of the clip body. This enables the terminal 58 to be bent outwardly in the manner shown so that it will be spaced above the workpiece or panel 12 and at a side thereof opposite from the terminal 56. It will further be appreciated that the prongs 50, 52 and 54 as well as the elements 56 and 58 may be utilized as terminals and that these prongs or elements might readily be deflected for engaging a printed circuit element, not shown, on the workpiece or panel 12.

In Fig. 5 and in Fig. 6 there is shown a clip element **22*a*** which is similar to the above described clip structures as indicated by the application of identical reference numerals with the suffix *a* added to the corresponding parts. This structure differs in that the terminal **58*a* is struck from the arm portion 34*a* of the clip structure and is provided with an enlarged apertured section 60 formed from material of a blank outwardly of the free end of the arm portion 34*a*. It will be appreciated that the terminal 58*a* may be formed in any desired manner and, in the embodiment shown, this terminal extends laterally from the mid-portion of the arm 34*a* and the enlarged apertured section 60 of the terminal extends upwardly so that its terminal end is in substatnially the same plane as the terminal ends of the arms 34*a* and 36*a*. This embodiment also differs in that it is provided with another terminal 62 in the form of a substantially straight narrow upstanding finger struck from the arm portion 36*a***. It will be appreciated that this terminal may also be formed in any desired manner and may be used for receiving a spade-type terminal, not shown, or may be connected in various other ways to an electrical component.

Fig. 7 shows another embodiment of the present invention wherein elements corresponding to those described above are identified by the same reference numerals with the suffix *b* added. In this embodiment the ends of the prongs **50*b* and 52*b* are preformed or bent outwardly prior to the application of the clip to the aperture workpiece or panel and a tab, not shown, corresponding to the above described tab 54 is similarly preformed. In order to accomplish assembly of the clip with the panel, the panel is provided with oversized apertures including apertures 64 and 66 through which the outwardly bent end potrions of the prongs may be inserted. The arrangement of the apertures is such that the leg portions 28*b* and 30*b*** of the clip must be grasped and resiliently deflected toward each other in order to permit the prongs to be inserted through the apertuers after which the clip is released so that the outwardly deflected end portions of the prongs will engage beneath the panel. It will be appreciated that this structure further facilitates easy and rapid assembly of the clip with the panel and it is also to be noted that after a rectifier prong or the like is applied to the clip, the side portions of the clip are positively prevented from collapsing so that any possibility of the prongs accidentally becoming disengaged from the panel is eliminated.

While the preferred embodiments of the present invention have been shown and described herein, it is obvious that many structural details may be changed without departing from the spirit and scope of the appended claims.

The invention is claimed as follows:

1. Holder means for receiving and retaining opposite end terminals of only a non-symmetrical properly orientated element having one terminal with a reduced diameter portion spaced from an end surface thereof, comprising a support member, and a pair of separate clips for receiving said terminals and mounted on said support member in adjacent spaced apart and substantially identically orientated relationship, each of said clips including a body having opposed legs extending along the support member and joined by a bight portion, resilient arms respectively extending transversely from said legs and away from the support member for gripping a terminal therebetween, and means separate from said arms extending from said bight portion and defining a restricted slot between said arms for accommodating only said reduced diameter portion of said one terminal when said one terminal is applied to the clip so as to traverse the bight portion.

2. A one-piece clip for attachment to a workpiece and of the type described comprising a generally U-shaped body having opposed legs joined by a bight portion, said legs and bight portion being substantially parallel to the workpiece when attached thereto and said legs being formed with opposing arms respectively extending laterally in one direction from longitudinal margins of said legs for receiving and retaining a terminal or the like therebetween, and elements separate from said legs extending from said bight portion laterally in said one direction and defining a slot therebetween having a width substantially less than a space between terminal engaging portions of said arms so that the slot will only accommodate a reduced diameter portion of a terminal.

3. A clip, as defined in claim 2, which includes attachment prongs extending from said body in a direction opposite from said one direction and adapted to extend to engage beneath an apertured workpiece for securing the clip to the workpiece.

4. A clip, as defined in claim 3, which includes a first electric terminal extending from said body in the same direction as said attachment prongs and adapted to extend through a workpiece when the clip is mounted to the workpiece, and a second electric terminal disposed so as to be at the same side of the workpiece as said body when the clip is applied to the workpiece.

5. A one-piece clip, as defined in claim 3, in which a pair of said attachment prongs respectively extend from said legs of said body and terminate in oppositely outwardly extending end portions engageable beneath a workpiece, said legs being resiliently collapsible toward each other to permit insertion of said pair of prongs through workpiece apertures and subsequent spreading of the prongs to position said end portion thereof beneath the workpiece.

6. A combination comprising a pair of substantially non-symmetrical and identical clips mounted on a workpiece adjacent to and spaced from each other in identically orientated relation, and an element having oppositely disposed terminals and requiring predetermined orientation, said terminals respectively being retained by said clips, each of said clips comprising a generally U-shaped body having opposed leg portions and a bight portion, said U-shaped member being disposed on said workpiece so that said leg portions are substantially parallel to and extending along said workpiece, resilient arms extending from said leg portions and transversely of said leg portions and away from said workpiece in opposing relationship for receiving and retaining a terminal therebetween, and spaced finger elements extending from said bight portion and defining restricted slot means between said leg portions, one of said terminals having a relatively small diameter portion disposed in the restricted slot means of the clip associated with said one terminal, another portion of said one and the other said terminals having a diameter greater than said relatively small diameter portion, and said restricted slot means having a width less than said greater diameter so as to positively insure proper orientation of the terminals.

7. A combination, as defined in claim 6, wherein each of said clips includes tab means extending from said bight portion and between said arms for cooperating with the arms for gripping and locating a terminal.

8. A combination, as defined in claim 6, wherein said clips are formed from sheet metal, and each of said clips includes a first electric terminal element extending from said body through the workpiece to a side of the workpiece opposite from the body, and a second electric terminal disposed at the same side of the workpiece as said body.

9. A combination, as defined in claim 6, wherein each of said clips includes prong means extending through and engaging beneath the workpiece for connecting the clips to the workpiece.

References Cited in the file of this patent

UNITED STATES PATENTS

| | | |
|---|---|---|
| 1,779,502 | Steinmayer | Oct. 28, 1930 |
| 1,907,968 | Hunt | May 9, 1933 |
| 2,086,727 | Morris | July 13, 1937 |
| 2,229,989 | Roby | Jan. 28, 1941 |
| 2,292,320 | Hammerly | Aug. 4, 1942 |
| 2,738,486 | Wadsworth | Mar. 13, 1956 |

OTHER REFERENCES

Page et al.: Abstract of application Serial No. 193,380, published March 24, 1953, 668 O.G. 1125.